(12) United States Patent
Ali

(10) Patent No.: US 9,633,330 B1
(45) Date of Patent: Apr. 25, 2017

(54) LATE STAGE SKU ASSIGNMENT

(71) Applicant: Seagate Technology LLC, Cupertino, CA (US)

(72) Inventor: Wajahat Ali, Longmont, CO (US)

(73) Assignee: Seagate Technoglgy LLC, Cupertino, CA (US)

( * ) Notice: Subject to any disclaimer, the term of this patent is extended or adjusted under 35 U.S.C. 154(b) by 0 days.

(21) Appl. No.: 14/245,127

(22) Filed: Apr. 4, 2014

(51) Int. Cl.
*G06Q 10/08* (2012.01)

(52) U.S. Cl.
CPC ......... *G06Q 10/087* (2013.01); *G06Q 10/083* (2013.01)

(58) Field of Classification Search
CPC .................................................. G06Q 10/087
USPC .......................................................... 705/28
See application file for complete search history.

(56) References Cited

U.S. PATENT DOCUMENTS

| | | | |
|---|---|---|---|
| 5,473,692 A | 12/1995 | Davis | |
| 6,442,559 B1* | 8/2002 | Martinsen et al. | |
| 6,584,559 B1 | 6/2003 | Huh | |
| 6,622,246 B1 | 9/2003 | Biondi | |
| 7,146,609 B2 | 12/2006 | Thurston | |
| 7,181,458 B1 | 2/2007 | Higashi | |
| 7,249,353 B2 | 7/2007 | Zarco | |
| 7,493,336 B2 | 2/2009 | Noonan | |
| 7,636,032 B2 | 12/2009 | Kantrowitz | |
| 7,681,245 B2 | 3/2010 | Walker et al. | |
| 7,685,139 B2 | 3/2010 | Atkinson | |
| 7,844,445 B2 | 11/2010 | Brunet et al. | |
| 7,929,692 B2 | 4/2011 | Kim | |
| 8,019,794 B2 | 9/2011 | Pathak | |
| 8,156,540 B2 | 4/2012 | Jaber et al. | |
| 8,250,567 B2 | 8/2012 | Gesquiere | |
| 8,392,895 B2 | 3/2013 | Tsai | |
| 8,442,877 B2 | 5/2013 | Bertness | |
| 8,474,015 B2 | 6/2013 | Jaber et al. | |
| 2003/0191973 A1 | 10/2003 | Johnson | |
| 2004/0205412 A1 | 10/2004 | Staron | |
| 2004/0268186 A1 | 12/2004 | Maturana | |
| 2005/0071273 A1 | 3/2005 | Vroman | |
| 2005/0135392 A1 | 6/2005 | Burns | |
| 2005/0171858 A1* | 8/2005 | Cotton et al. .................. 705/26 |
| 2006/0067237 A1 | 3/2006 | Burns | |
| 2008/0010361 A1 | 1/2008 | Jacobs | |

(Continued)

OTHER PUBLICATIONS

Chiodi, M. D. (2006). An integrated analysis of a third party logistics company's ordering policies and operations (Order No. 1434966). Available from ProQuest Dissertations & Theses Global. (305316605). Retrieved from http://search.proquest.com/docview/305316605?accountid=14753.*

(Continued)

*Primary Examiner* — Scott Zare
(74) *Attorney, Agent, or Firm* — Cesari & Reed, LLP; Kirk A. Cesari; Christian W. Best

(57) ABSTRACT

The present disclosure relates to late stage SKU assignment. In an embodiment, a device may be assigned a complete SKU having a predefined portion and a variable portion. The predefined portion may be set during a manufacturing process of the device, and the variable portion may be assigned after manufacture, after shipping, or after the device is put into use. In some embodiments, the variable portion may be based on a set of features enabled on the device.

18 Claims, 13 Drawing Sheets

(56) References Cited

U.S. PATENT DOCUMENTS

| | | |
|---|---|---|
| 2008/0189693 A1 | 8/2008 | Pathak |
| 2008/0316002 A1* | 12/2008 | Brunet et al. ............ 340/10.41 |
| 2009/0320012 A1 | 12/2009 | Lee |
| 2011/0250878 A1 | 10/2011 | Yu |
| 2011/0295947 A1 | 12/2011 | Yu |
| 2013/0275261 A1 | 10/2013 | Yoked |
| 2013/0290714 A1 | 10/2013 | Hans |
| 2014/0337152 A1* | 11/2014 | Renaldi et al. ................ 705/22 |
| 2014/0370941 A1 | 12/2014 | Wadman et al. |
| 2015/0065105 A1* | 3/2015 | Masterson ........... H04W 8/205 455/418 |

OTHER PUBLICATIONS

Forehand, Feature Activation Using Near Field Communication, U.S. Appl. No. 14/254,900, filed Apr. 4, 2014, 51 pages.
Ali, Recipient-Specific Feature Activation, U.S. Appl. No. 14/245,177, filed Apr. 4, 2014, 52 pages.
Forehand, Remote Feature Activation, U.S. Appl. No. 14/245,895, filed Apr. 4, 2014, 51 pages.

* cited by examiner

LATE STAGE SKU ASSIGNMENT

SUMMARY

In an embodiment, a method may comprise assigning a stock keeping unit (SKU) number to a device, including assigning a preset portion of the SKU number, and assigning a variable portion of the SKU number after packaging the device for shipping from a manufacturing location.

In another embodiment, a device may comprise a data storage medium storing a predefined portion of a complete stock keeping unit (SKU) for the device, and a processing circuit. The processing circuit may be configured to receive, from an activation entity external to the device, an indication of a variable portion of the complete SKU, the complete SKU based on the pre-defined portion and the variable portion, and store the indication.

In another embodiment, a device may comprise a memory, and a processing circuit configured to access firmware stored in the memory. A complete stock keeping unit (SKU) of the device may include a predefined portion and a variable portion, the predefined portion is assigned prior to shipping the device from a manufacturer of the device, and the variable portion is assigned based on features of the firmware selected after manufacturing.

DETAILED DESCRIPTION

In the following detailed description of the embodiments, reference is made to the accompanying drawings which form a part hereof, and in which are shown by way of illustration of specific embodiments. It is to be understood that other embodiments may be utilized and structural changes may be made without departing from the scope of the present disclosure. It is also to be understood that features of the various embodiments can be combined, separated, exchanged, or removed without departing from the scope of the present disclosure.

Devices may be configured to have a number of different options, features, or other variants. For example, computing devices may be loaded with or run different firmware to implement different feature sets. In an example embodiment, a single physical model of data storage device may be configured with different data storage or encryption features depending on the firmware running on the device. For example, the device may include a single firmware capable of performing different selectable feature sets. In another example, a device may include multiple firmware versions, and one or more firmware versions may be enabled or disabled to implement different features or functions. Different device variants may have different market values. Customers, markets, or other intended recipients of devices may request, place orders for, or show demand for different feature sets or configurations of a device. Further, this demand may change over time.

Different feature sets and variations of devices can result in a plethora of shipping variants for a device. Changes in market demand or specific customer orders can create complexity and inefficiency in production and shipping. For example, devices may need to be recalled, unpackaged, and powered on to load a new feature set or firmware in response to changing product demand. Uncertainty in final configurations for customer orders can result in shipping delays. Changing product configurations and values can create complexity in assigning and maintaining stock keeping units (SKUs). Accordingly, it may be desirable to postpone the complexity of setting device configurations and SKUs late into the production or supply chain, or even until receipt by an end recipient. Intended recipients may be referred to herein as "customers," although other intended recipients are included within the scope of the disclosed embodiments.

Figure 1:
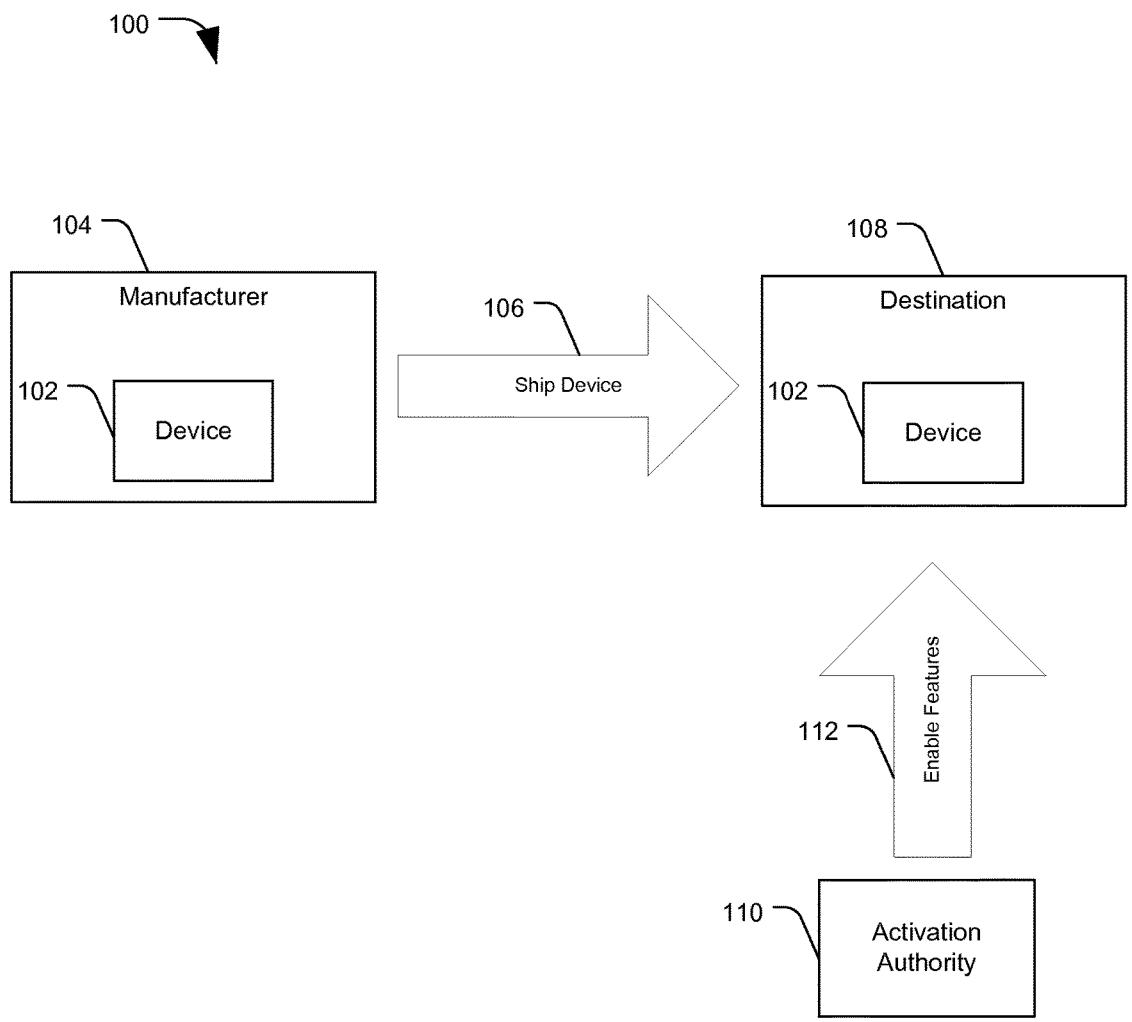
FIG. 1 is a diagram of an illustrative embodiment of a system for late stage SKU assignment.

FIG. 1 depicts an embodiment of a system for late stage SKU assignment, generally designated 100. System 100 shows an example process for delaying activation of device feature sets late into the device's supply chain. In the example system 100, device 102 is produced at a manufacturer 104. In some embodiments, manufacturer 104 may represent a factory at which the device is fabricated, or it can represent a location or entity farther down the supply chain, such as a separate original equipment manufacturer (OEM) reselling the devices under the company's brand name. The device 102 may be any type of device capable of having multiple configurations or feature sets, for example computers, phones, tablets, data storage devices, televisions, set-top boxes, gaming systems, or other devices. For example, device 102 may be a data storage device having a memory, processor, and an interface that can physically connect and disconnect from a host computer, the interface configured to allow data communications between the data storage device and the host computer. In some embodiments, device 102 may be produced and not loaded with any firmware or software to control device operations, or it may be loaded with a basic set of firmware or software, such as firmware enabling the device 102 to detect and load additional firmware or software at a later point. In some embodiments, firmware may be loaded onto the device 102 which enables the device to perform some or all potential configurations and feature sets, and selected features may be enabled or disabled at a later point. For example, the device 102 may be loaded with five different firmware versions, and the device may be instructed to implement a selected one of the five firmware versions at a later point. In another example embodiment, the device 102 may be loaded with a single firmware that may be capable of performing all potential features, and the device 102 may be configured at a later point to enable or disable a subset of those features. Other configurations are also possible.

The system 100 may include shipping the device 102 to a destination 108. For example, if manufacturer 104 represents a production factory, destination 108 may represent an OEM facility. If manufacturer 104 represents an OEM, destination 108 may represent a party farther down the supply chain. In some embodiments, destination 108 may include a distributor (e.g. a warehouse for a retailer), or even an end customer. At the destination 108, the device 102 may then have a selected feature set or variation activated or enabled. For example, an activation authority 110 may be contacted with a request to activate a feature set on the device 102.

Activation authority 110 may include the OEM, or an authorized third party. For example, the activation authority may be a licensing authority or other security authority having an established trust relationship with the manufacturer, and authorized to activate devices of the manufacturer. The activation authority may be a retailer, such as an online retailer that allows a customer to select and purchase a feature set, and activates the selected features in return for payment.

The activation authority 110 may enable features 112 on the device 102. For example, the activation authority 110 may provide to the destination 108 or device 102 an activation code, digital certificate, firmware or software, or other data or rights to activate, enable, or load a feature set on the device 102. For example, the activation authority 110 may receive a UID (unique identifier) for the device 102 from the destination 108. After verifying the UID and determining an associated authorized feature set, the activation authority may provide a physical or digital package to the destination 108 or device 102 including one or more keys or digital certificates to authenticate the package and the activation authority, as well as any additional authorities such as a license authority. The package may also include data for enabling a feature set, e.g. a listing of features to activate on pre-loaded firmware of the device 102, or firmware or software the device 102 may install in order to enable the features.

After activating features on the device 102, the device may be used at the destination 108, or the device 102 may be sent farther along the supply chain, for example to a retailer or customer. A process of remotely activating features may be repeated. For example, a customer may receive an activation package on a device the customer has already been using, where the package may include a firmware update enabling new features on the device. In some embodiments, a desired feature set for a device 102 may be known prior to shipping, but the features may not be activated until after shipping to simplify managing the supply chain.

Figure 2:
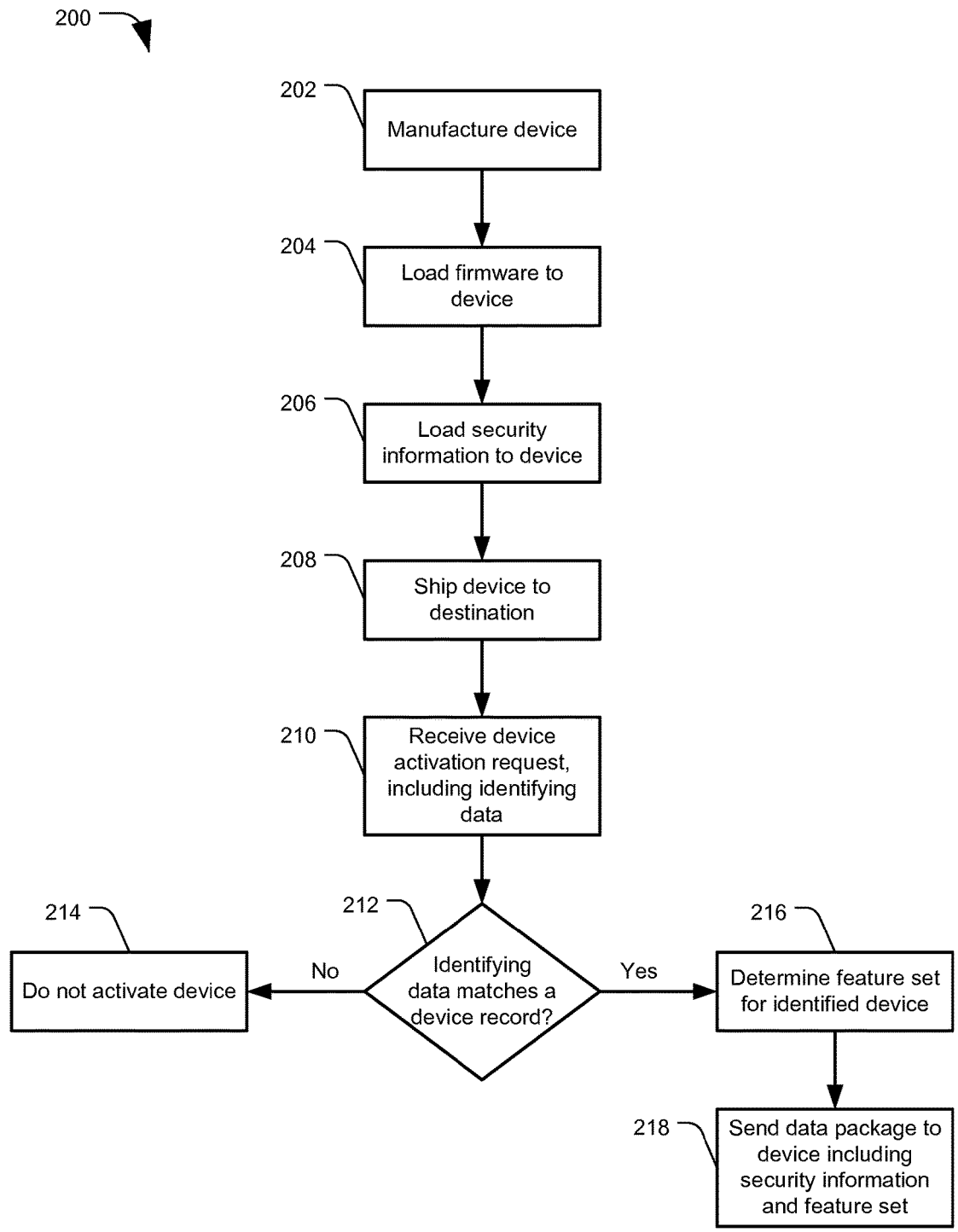
FIG. 2 is a flowchart of an illustrative embodiment of a method for late stage SKU assignment.

Turning to FIG. 2, a method for late stage SKU assignment is shown and generally designated 200. The method 200 may include manufacturing a device, at 202. For example, manufacturing may include assembling the physical components of a device. In some instances, manufacturing may also include loading an initial set of firmware and software (e.g. at 204), loading security data or other data (e.g. at 206), and establishing initial settings and functions for the device at a manufacturing location. After manufacturing, a device may be stored at a manufacturer's location, such as in a warehouse, and then may be shipped to a recipient. The device may include any sort of device which may be configured with different features or options after the device has been manufactured.

The method 200 may include loading firmware to the device, at 204. This may be performed at a manufacturing plant or at a later point in the supply line. In an example embodiment, only very basic firmware may be loaded to allow the device to detect a full operating firmware or software set loaded later including a finalized set of features or options. In other embodiments, a single robust firmware set may be loaded including all potential features or options, and specific features may be activated, deactivated, or completely disabled at a later point. In another embodiment, the method 200 may involve loading the device with multiple sets of independent or interoperable firmware, with one or more of the firmware sets capable of activation or deactivation at a later point to enable specific features or options.

The method 200 may also include loading security information to the device, at 206. For example, the device may be loaded with one or more keys or security certificates to enable the device to engage in secure communications or to recognize data from trusted sources. In some embodiments, the device may be loaded with one of a symmetric key pair, or keys from asymmetric key pairs. The device may use the security information to decrypt or authenticate data packages loaded to the device at a later point which may include information to enable or load a feature set of the device. This can prevent unauthorized parties from loading malware onto the device or from activating or deactivating features without proper approval. For example, the security information may be loaded by the manufacturer, and the manufacturer may later provide a secure feature activation package to the device. In another embodiment, security keys or certificates for loading to the device may be provided by one or more trusted activation authorities, licensing authorities, or commerce authorities. One or more of the trusted authorities may then be able to activate features on the device by encrypting or signing activation packages with corresponding keys or including certificates for authentication.

The method 200 may involve shipping the device to a destination, at 208. For example, if the manufacturing and data loading steps were performed at a factory, shipping the device may include sending the device to an OEM facility. In some embodiments, the device may be manufactured at a factory, then the firmware and security information may be loaded at an OEM facility, and the device may then be sent to a distributor, retailer, or customer at 208.

The method 200 may include receiving a device activation request, including identification data, at 210. For example, after the device has reached a specified destination, a party may desire to remotely activate a feature set on the device. Remote activation of features or firmware configurations may mean activating configurations on a device without physically connecting the device to computers during a manufacturing process. For example, a device may receive an indication of a selected configuration via near field communication after the device is packaged for shipping to a destination. In another example, a device may receive an indication of a selected configuration over a network after receipt by a customer or other recipient at any location relative to an activation authority, such as a manufacturer, shipping entity, or other trusted activation entity.

In some embodiments, a remote activation process may involve retrieving a unique identifier for the device and transmitting that information to an activation authority for the device. For example, a digital device may be powered on, and may connect to a network and transmit the device's UID to a pre-programmed activation authority. The UID transmission may be encrypted with a secure key or digital certificate, of the device so that the activation authority can authenticate that the request originated from an approved device. In some embodiments, the device may be connected to a computer, which may retrieve identifying information from the device. For example, the computer may download user interface software from the device allowing the user to select desired features, and submit the requested features, possible payment, and device identifying information to an activation authority. The activation authority may include the manufacturer, or one or more security authorities (e.g. to issue trusted certificates), commerce authorities (e.g. to process transactions), license authorities (e.g. to issue licenses), or other trusted authorities for activating a feature set on the device.

The method 200 may include determining whether the identifying data received at 210 matches a device record, at 212. For example, a UID received with the activation request may be compared against a database of UIDs for shipped devices. In some embodiments, identifying information may only include a device manufacturer, device model number, or other information indicating that the device may be serviced by the activation authority. Determination 212 may also include authenticating the request by verifying a digital signature on the request or attempting to decrypt the request with a designated key.

If a determination is made that the identifying data from the device does not match supported device records or is not authentic, at 212, the method 200 may include not activating the device or any feature sets or options thereof, at 214.

If the device has been authenticated at 212, the method may include determining a feature set for the device, at 216. For example, a feature set for the device may have been designated by a manufacturer or authentication authority after the device was manufactured but prior to receiving the activation request, at 210. In such embodiment, the method may include looking up the feature set designated for the device in a database. In another embodiment, a customer, client, or other entity may select one or more features or options to enable on the device, and submit those selections along with or in addition to the activation request and device identifying information. For example, a customer may select desired features and pay a fee, authorizing the selected features for activation on the customer device.

The method 200 may include sending a data package to the device, which may include security information and the selected feature set, at 218. The data package may include a digital package, for example sent over the internet or wirelessly, to the device, a computer in communication with the device, or another computing device of a recipient. In another embodiment, the data package may include a physical package, such as data recorded onto a DVD, flash drive, memory card, or other storage medium. In some embodiments, the package may include printed or audio material, such as activation codes which may be entered by a customer or other activating entity.

The data package may include security information, such as certificates for one or more activation authorities or the manufacturer, or the device may be digitally signed or encrypted by a key. For example, the data package may be encrypted so that the device can decrypt the package using a secure key stored on the device; if the data package is not decryptable with the device's key, the device may not activate the indicated features or install any included software. In other embodiments, the device may verify a certificate included with the package prior to performing operations based on the package.

The package may include a feature set, such as the features identified for the device at 216. In some embodiments, the package may identify features to activate, deactivate, or to disable on the device, with the device already including any necessary hardware, software, or firmware to implement the selected features. In another embodiment, the data package may include software, firmware, program code updates, or other information for implementing the selected features, and the device may install the included code to enable the features. Other embodiments and combinations are also possible.

Figure 3:
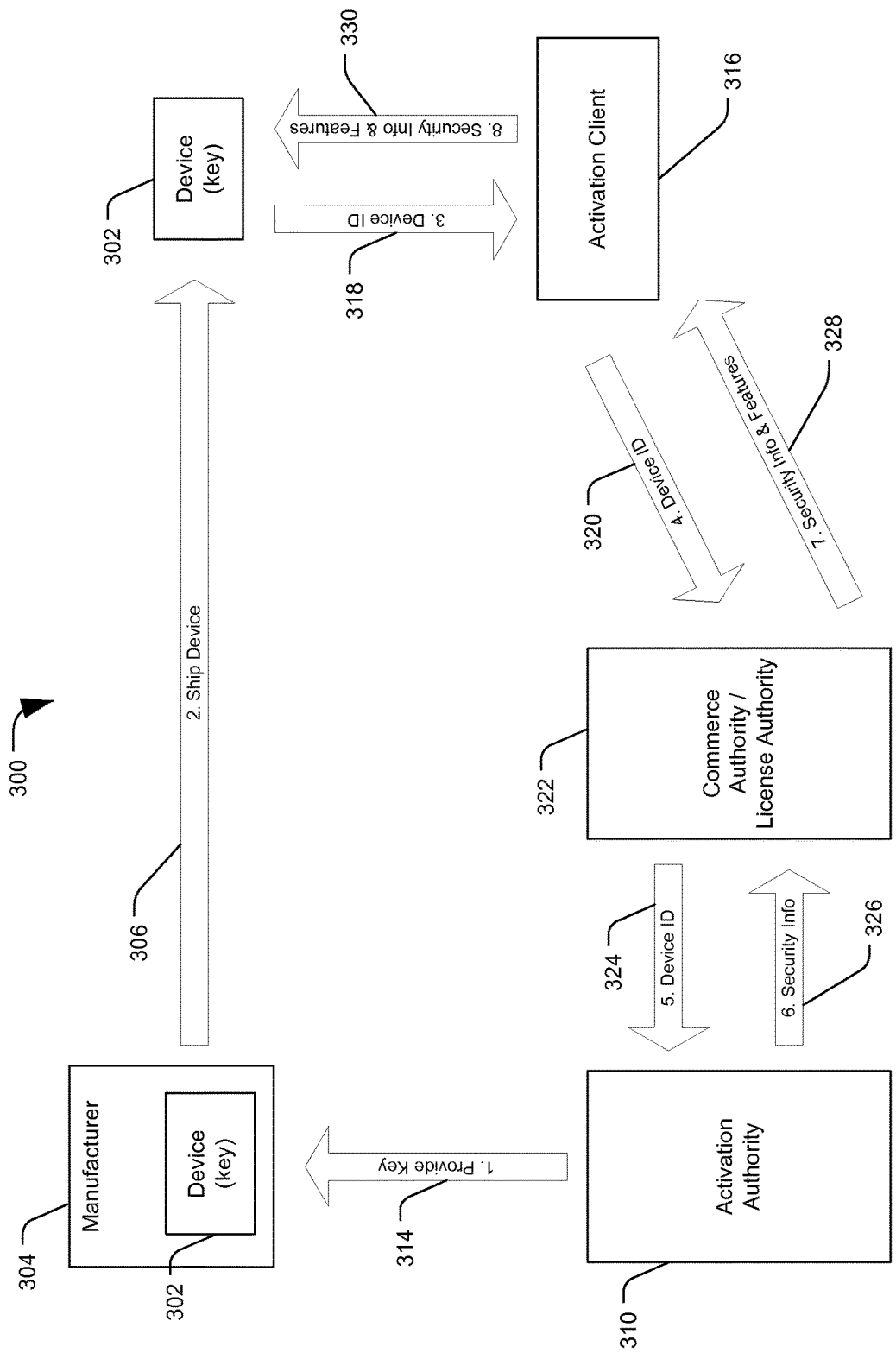
FIG. 3 is a diagram of an illustrative embodiment of a system for late stage SKU assignment.

FIG. 3 depicts an embodiment of a system for late stage SKU assignment, generally designated 300. The system 300 may be an embodiment of the system shown in FIG. 1, and may perform the method shown in FIG. 2. They system 300 may include an activation authority 310, which may correspond to activation authority 110 of FIG. 1. Activation authority 310 may include the manufacturer for a device, a trusted security authority, or one or more other parties with authority to approve or activate features or options on a device. Activation authority 310 may select or manage security information, such as keys or certificates, to ensure secure transmission or authentication of devices and feature activation packages.

Activation authority 310 may provide one or more security keys 314 to a manufacturer 304 of a device 302. For example, this may include one or more sets of keys for symmetric key pairs, asymmetric key pairs, security certificates, or other security information to be loaded onto device 302. The security information provided by activation authority 310 may allow activation authority 310 to recognize communications from devices (e.g. through digital signatures), as well as allowing devices to recognize and authenticate communications and data from the activation authority 310. In some embodiments, multiple authorities (e.g. license or commerce authorities 322, security authorities) may provide keys or certificates to establish authority and security for their involvement in the remote feature activation system.

Manufacturer 304, which may correspond to manufacturer 104 of FIG. 1, may load the security information onto devices 102, as well as any initial firmware or software. One or more additional keys may be loaded onto device 102 in addition to the security information received from activation authority 310. Manufacturer 304 may ship 306 device 302 to a specified destination (e.g. distribution facility, retailer, customer). An activation client 316 may then be used to activate features on the device 302. An activation client 316 may represent entities, devices, or both used in device activation. For example, device 302 may include software for an activation client user interface program loaded onto the device. When the device is plugged into a computer, the computer may download and install the software from the device, loading a user interface program for device activation onto the computer. In another embodiment, an activation client may be a device for scanning device packages and for loading data packages onto device, for example using near-field communication (NFC), radio frequency identification (RFID) technology, or any other wireless transmitting and receiving technology that can perform the functions described herein. In another embodiment, an activation client 316 may include a computer running software for device activation, the computer having access to databases or information scanned from separate scanning devices. Other embodiments are also possible.

Activation client 316 may obtain information 318 from device 302 identifying the device, such as a UID. In some embodiments, the activation client may also obtain a list of features available for the device 302, either from the device itself or from other sources, such as the internet. Information obtained from the device 302 may be encrypted or digitally signed using security information loaded on the device. Activation client 316 may allow a user to select desired features, enter payment information, register the device, save or print licensing information or other options. The information obtained from the device 302, as well as selected features, payment information, or other information, may be sent 320 to a commerce authority 322. For example, commerce authority 322 may be a retailer, bank, or other party with a trust relationship with the manufacturer 304, activation authority 310, or other authorities involved in the feature activation process. Commerce authority 322 may accept payments corresponding to selected features, payments for the device 302, or other activities. The commerce authority 322 may also verify the authenticity of the device 302 or the activation request. For example, security information or certificates from the commerce authority 322 may be loaded onto the device 302 by the manufacturer 304, and the commerce authority 322 may verify that the appropriate security information has been included from the device 302 as part of the transmission 320 from the activation client. Although a single commerce authority 322 is depicted in the example system 300, more or no commerce authorities may be include, or different authorities may be included, such as a licensing authority. For example, an import authority may be included which authorizes the use of a device in a particular country or region. Regional authorities may be used to manage regional rights regarding features and distribution (e.g. some features may be covered by intellectual property rights in some countries but not others, or some features may not be covered by regional distribution agreements).

Commerce authority 322 may pass information along to the activation authority 310, such as device ID information 324, security information, or other information. Activation authority 310 may verify a trust relationship based on the device ID information, security information, or other information. Activation authority 310 may create an activation package, which may include features or options to activate on the device, security certificates, digital signatures, or other information. In some embodiments, the commerce authority 324 or another authority may create a package and send it to the activation authority 310, and the activation authority may add information, add a digital certificate or signature, or otherwise modify the package. In some embodiments, the commerce authority 322 may pass limited information to the activation authority 310, and the activation authority may return security information, which the commerce authority may add to a data package.

After verifying or signing data from commerce authority 322, or creating a data package, activation authority 310 may send information back 326 to the commerce authority. In some embodiments, activation authority 310 may send data or a package directly back to the activation client 316, the device 302, or another authority.

After receiving security information or other data from the activation authority 310, the commerce authority 322 may add the security information to an activation package, or verify a signature or other authorizing information from the activation authority. Once an activation package is compiled with a feature set to activate on the device 302, or firmware or software to add to device 302, as well as any necessary security information to prevent tampering and counterfeiting and to validate the package to the activation client 316 or device 302, the commerce authority 322 may send the package 328. The activation package may be sent to the activation client 316 or directly to the device 302.

As stated previously, an activation package may be transmitted digitally, or it may be sent on a physical medium. It should be noted that physical packages such as DVDs, flash drives, memory cards, dongles, or other mediums may be involved in the remote activation process in other ways. For example, security information for a trusted activation authority could be loaded onto a USB key and connected to device 302 or activation client 316 in order to establish a trust relationship and allow feature updating.

Either the activation client 316 or the device 302 may validate the activation package, decrypt data, install any necessary data to the device 302, or activate or deactivate a set of features on the device 302. If the package is sent to the activation client 316, either the package or data extracted from the package may be sent 330 to the device 302. The device 302 may perform any updates to firmware or software dictated by the received data to implement a specified feature set. The activation package may include additional information, such as security certificates for new authorized commerce or licensing, or activation authorities, allowing the device to be updated by additional entities in the future.

Figure 4:
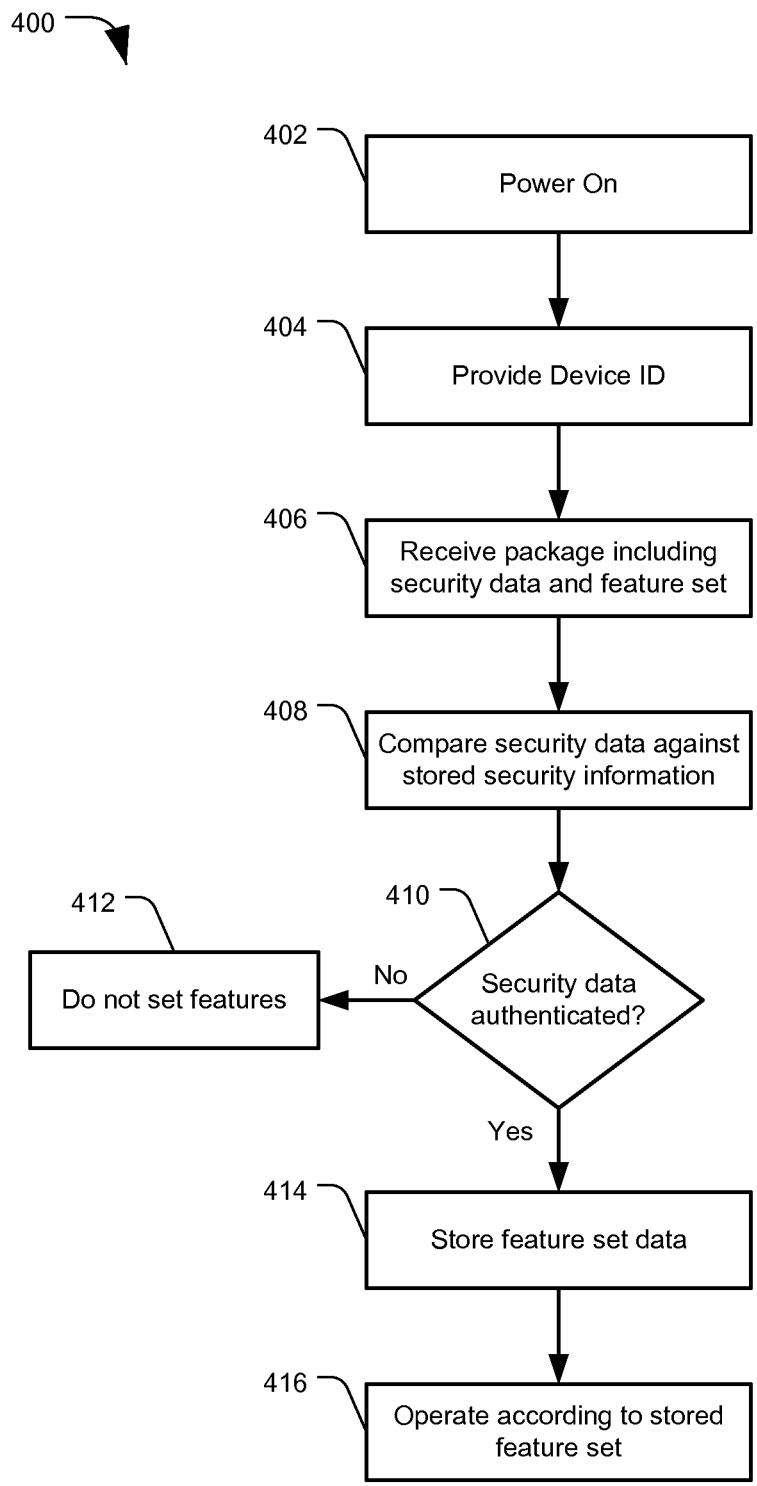
FIG. 4 is a flowchart of an illustrative embodiment of a method for late stage SKU assignment.

Turning to FIG. 4, an embodiment of a method for late stage SKU assignment is shown and generally designated 400. Method 400 may be performed by a device configured to implement a specified feature set or set of options based on remote activation. The device may power on, at 402. For example, this may include detecting a connection to another device, such as by being plugged into a computer or detecting an activation client running on a device.

Method 400 may include providing a device ID, at 404. For example, this may include providing a UID stored on the device, a model number, or other information. In some embodiments, the information may be signed or encrypted with one or more keys stored on the device. The information may be transmitted to an attached device or activation client. In some embodiments a device may passively provide the device ID. For example, the device ID and other information may be stored to a RFID tag on the device, which can be read by scanning the device with an RFID reader. In embodiments where device information is provided passively, the device may not need to be powered on at 402.

Method 400 may include receiving a package including security data and a feature set, at 406. For example, this may include receiving the package from an activation client running on an attached computer, receiving the package over a network from an activation authority, having the data written to a near field communications chip on the device, loaded onto the device through a DVD or USB drive, or through other methods.

The package may include security data. For example, the package may be encrypted or digitally signed using a private key from an activation authority, or the package may include one or more security certificates. The package may also designate a feature set for the device. A feature set may be designated by indicating which features to activate or deactivate on the device, from a list of features the device is already capable of performing. In another embodiment, the package may include software, firmware, or updates which the device may load or install in order to perform the specified features. For example, the package may include a code or key, which may correspond to a specific feature set loaded on the device.

The drive may compare the security data against stored security information, at 408, and verify the authenticity of the package, at 410. The device may authenticate the package by attempting to decrypt the package or verify a signature using one or more keys stored on the device, by checking the security certificates, or through other means. If the device is unable to authenticate the package, the device may not set or activate features identified in the package, at 412. If the device can authenticate the package, the method 400 may include storing the specified feature set to the device, at 414. For example, this may include installing software or firmware, deleting firmware or software corresponding to features not selected, updating a table of features to indicate which are active, or through other methods. In some embodiments, some or all steps of comparing security information or verifying the authenticity of the package may not be performed by the device. For example, an activation client may perform steps of verifying the package, and only forward data to the device after it has been verified.

The method 400 may include operating according to the stored feature set, at 416. In some embodiments, a feature set may be locked in once selected, and cannot be changed. In other embodiments, a device may operate according to a selected feature set until a new feature set is designated, for a set period of time, or according to other criteria. For example, a customer may purchase a license to use a designated feature set for six months, and after six months the selected features may "expire" and become unusable. In other embodiments, a feature may available in specific regions or geography, for example by an authority of that region or geography. In another embodiment a feature may work only when specific conditions in a surrounding system or network are met or authenticated. For instance, the feature could be bound to the computer system or network. Additionally, a feature may only be enabled when a local software or hardware token, smartcard, near-field authority or other element are present to allow use of the capability or feature. Other embodiments are also possible.

Figure 5:
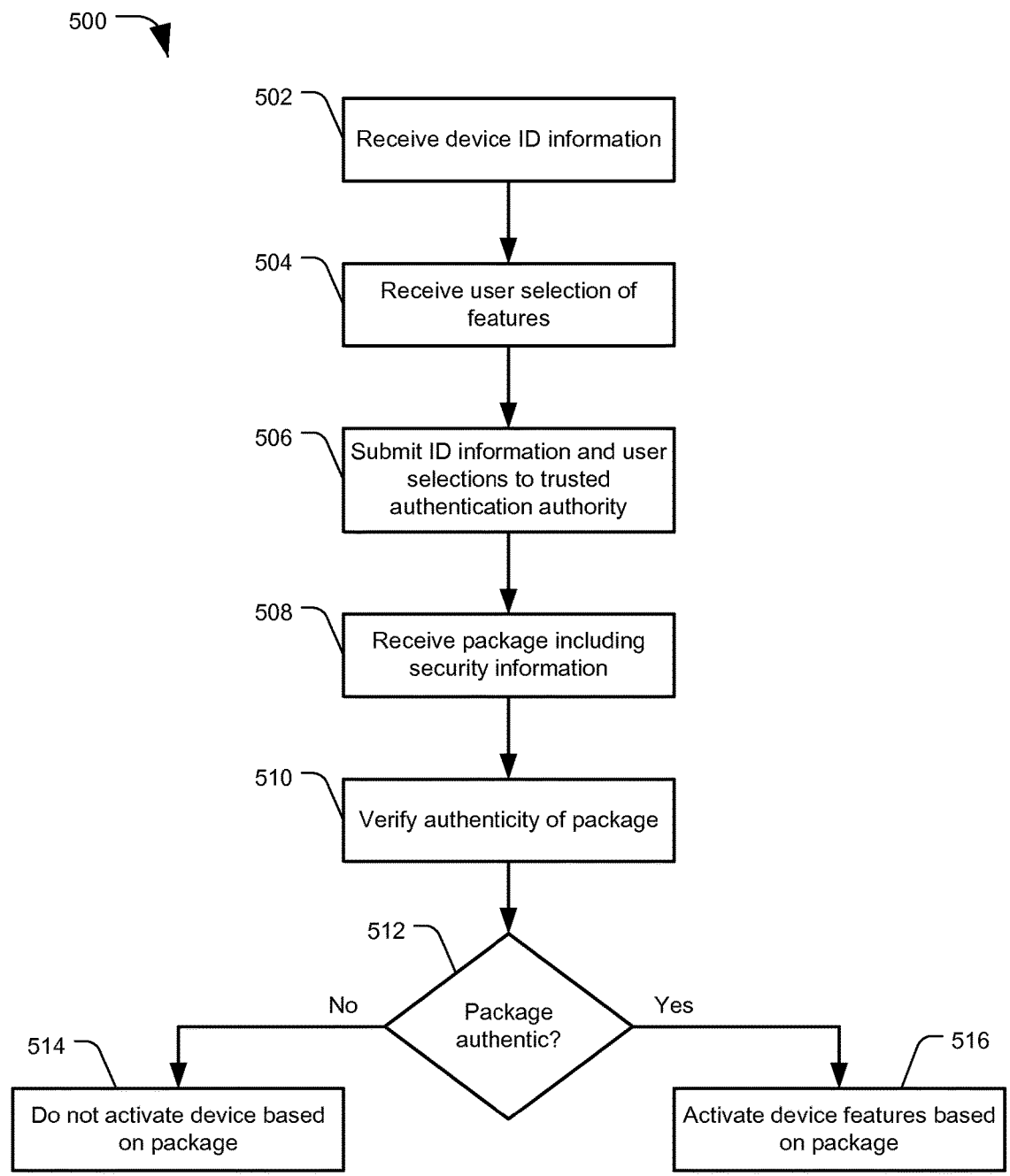
FIG. 5 is a flowchart of an illustrative embodiment of a method for late stage SKU assignment.

Turning to FIG. 5, an embodiment of a method for late stage SKU assignment is shown and generally designated 500. Method 500 may be performed by an activation client in communication with a device which is configured to have a feature set remotely activated. For example, an activation client may include a processor running an instruction set, a hardware and software appliance, or a simple hardware appliance to perform the method 500.

Method 500 may include receiving device ID information, at 502. For example, this may include querying a device for a UID, model number, manufacturer, digital certificate, firmware version, key, or any other data. The requested data may be encrypted or digitally signed by the device. The information may also include software for a user interface to install on a connected device to allow a user to proceed with a feature activation process for the device. In some embodiments, the device information may include a listing of features or feature sets which may be activated or deactivated.

Method 500 may include receiving a user selection of features, at 504. For example, a user may select features to implement through a user interface of an activation program for the device. Additional information may also be collected, such as payment information, personally identifying information from a user, an agreement to terms and conditions, registration information for the device, or any other information. In some embodiments, feature selection may be accomplished by means of entering a code or key, which may correspond to a select set of options. For example, a device may ship from a manufacturer without a predetermined feature set, and a user may purchase the device and a corresponding desired feature set. The user may be given a key corresponding to the selected feature set, which may then be used to activate the corresponding features on the device during an activation process.

Method 500 may include submitting the device ID or other device information, as well as any user information, to a trusted authentication authority at 506. For example, the information may be sent to a device manufacturer, or to some trusted licensing authority with the ability to activate features on the device. In some embodiments, the method may include contacting a commerce authority with feature choices and payment information to unlock features. Authorities may request additional information, resulting in one or more exchanges of data between an activation authority and an activation client. Information may be sent digitally (e.g. over a network), or may be submitted physically (e.g. by printing out the necessary information and mailing it to an activation authority).

At 508, the method may include receiving a package from an activation authority, manufacturer, or other trusted authority. The package may include security information, such as encrypted or digitally signed data, digital certificates, or other information usable to verify the authenticity of the data activation package. The activation package may also include a selected feature set, firmware or software, or other information to implement the remote feature activation.

At 510, the method may include verifying the authenticity of the package. For example, the activation client may compare the security information received in the activation package against security information obtained from the device or otherwise available to the activation client. Verification may include attempting to decrypt the package with a given key, verifying security certificates, verifying the activation client, or other measures.

If the activation package is determined to not be authentic (e.g. not issued by a trusted activation authority or lacking integrity), at 512, the method may include not activating the device based on the package, at 514. If the activation package is determined to be authentic, at 512, the method may include activating the device with a selected feature set based on the package, at 516. This may include forwarding the package to the device, or sending an activation command, or loading firmware or software onto the package to implement the feature set. Other methods of activation are also possible.

Figure 6:
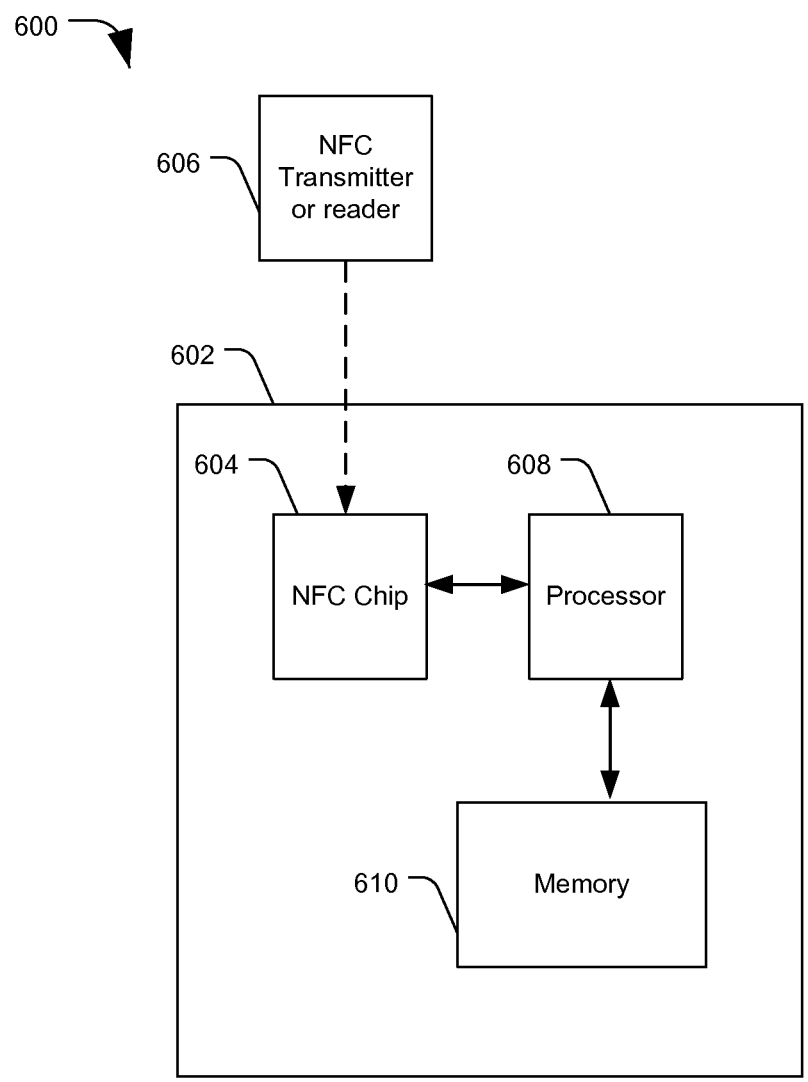
FIG. 6 is a diagram of an illustrative embodiment of a system for late stage SKU assignment.

Turning to FIG. 6, a system of remote feature activation is shown and generally designated 600. The system 600 may include a device 602 configured for remote feature activation via near field communication (NFC). NFC may include a set of communication standards allowing devices to communicate through touch or by being within a relatively small proximity with each other. A sufficient proximity may vary according to an amount of power applied to the devices for communication, but is generally several meters or less. NFC is often accomplished between an NFC chip or "tag," and a reader device to read data from or store data to the tag. A common type of NFC is radio frequency identification (RFID), although other communication protocols are also possible, such as any other wireless data transmission protocol capable of performing the functions described herein.

System 600 may include a device 602 configured for feature activation using near field communication. Device 602 may include a NFC chip 604. A NFC chip 604 may be capable of storing data. For example, NFC chips may be read-write (can be read from and written to or rewritten), read-only (data is stored to them initially and cannot be changed), or write once, read many (WORM; which can be written to once, but cannot be overwritten). NFC chips may be active or semi-active, which may include or require batteries for increased broadcast range or data storage, or NFC chips may be passive "tags", which may rely entirely on a signal from a reader device 606 as their power source.

NFC transmitter or reader 606 may be a device capable of reading data from or storing data to the NFC chip 604, without needing to power on or physically connect to device 602. For example, the reader 606 may be capable of reading device ID, manufacturer, model number, certificate, key, or other information from the tag 604 of the device 602, and may use the data to request or select a feature activation package.

The reader 606 may also be able to store data to the tag 604. In an embodiment, a batch of devices may be manufactured, packaged, and loaded onto a pallet for shipping. An operator with a hand-held NFC transmitter or reader may then be capable of storing data, either encrypted or unencrypted, identifying a selected feature set for the device 602. In some embodiments, an NFC transmitter may comprise an automated device capable of loading feature data on one or more devices simultaneously as they pass through a point of a production or shipping line. For example, devices may be manufactured at a factory, then shipped to a distributor or retailer warehouse. The distributor or retailer may be sent feature activation data, which may be stored to RFID tags on the entire shipment of devices prior to sending the devices to a next or final destination. In another embodiment, the NFC transmitter 606 may be a mobile phone, tablet, or other personal device. A customer may be sent an activation package (e.g. by e-mail, SMS message, or downloaded off a website), and may be able to use their phone to store the activation data to their device. Storing encrypted data may prevent unauthorized parties from setting a feature set of the device. In another embodiment, write-once read-many chips may be used, allowing an authorized authority to load a feature set, but preventing the feature set from being overwritten at a later point. Other embodiments are also possible.

Device 602 may also include a processor 608 and a memory 610. Memory may include one or more volatile or non-volatile memories, include ROMs, RAM, hard disc, flash memory, or other memory formats. Processor 608 may include one or more circuits or microprocessors to execute firmware, software, or other instruction sets, such as implementing selected feature sets for the device 602. In an embodiment, when the device 602 is powered on the processor 608 may check for activation data on the NFC chip. For example, the processor 608 may be configured to check for an activation package, and may verify the package via decryption or other methods. The processor 608 may then implement a selected feature set. For example, this may include storing a feature configuration from the NFC chip to a memory 610, and loading firmware or software from memory 610 to control operation of the device 602 according to the selected features.

Figure 7:
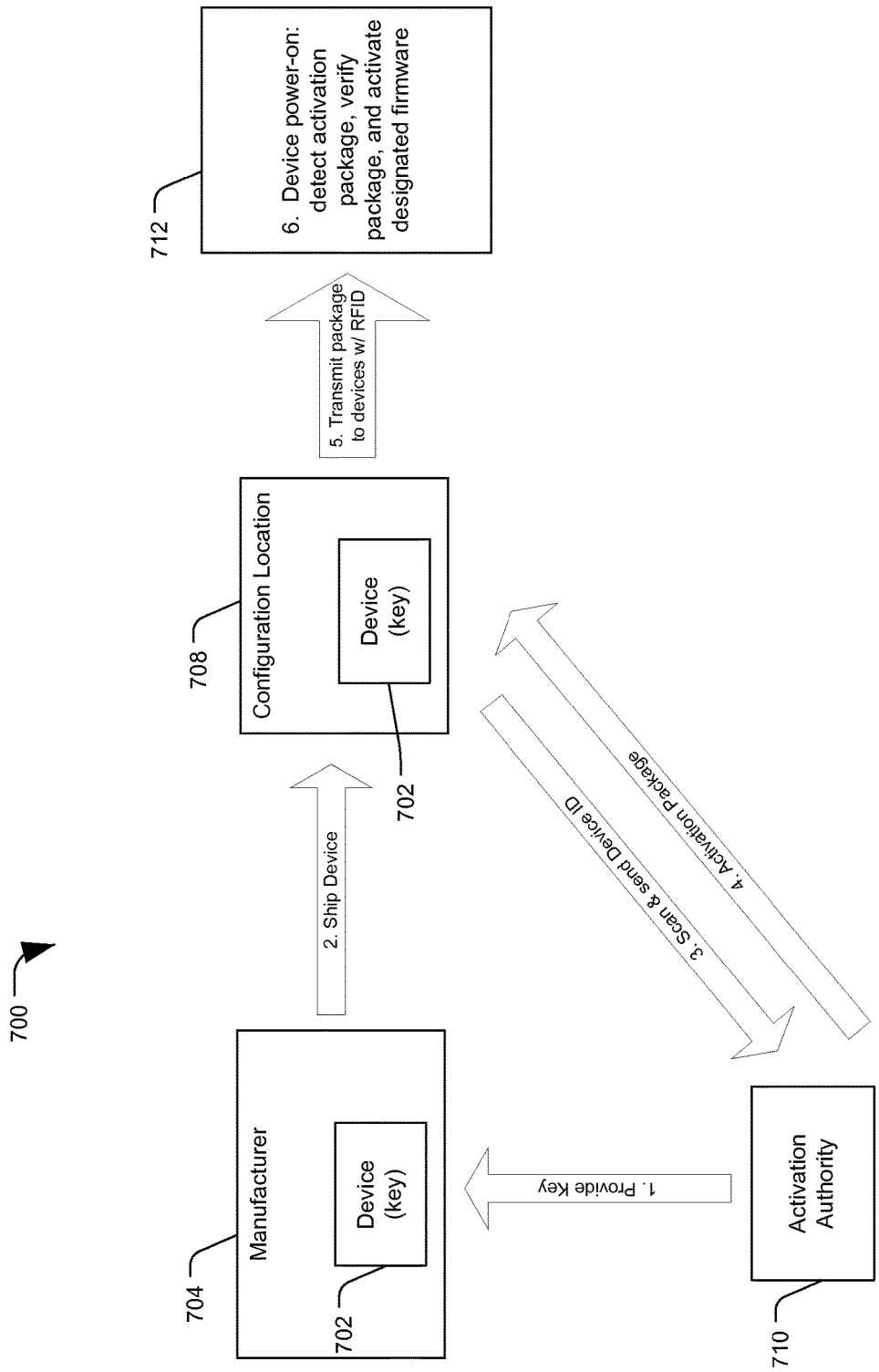
FIG. 7 is a diagram of an illustrative embodiment of a system for late stage SKU assignment.

FIG. 7 depicts an example embodiment of a system for late stage SKU assignment, generally designated 700. System 700 may correspond to a method of remotely activating a feature set using NFC, such as described in relation to FIG. 6.

Activation authority 710 may provide security information, such as one or more secure keys, to a manufacturer 704 to load onto device 702. In some embodiments, the activation authority and manufacturer may be the same entity. The device 702 can use the security information to verify the authenticity of feature activation packages. The manufacturer 704 may ship the device 702, now loaded with keys or other security data, to a configuration location 708.

Configuration location 708 may be a retailer or distribution warehouse where devices may be configured with desired feature sets in bulk. In some embodiments, configuration location 708 may comprise a final recipient. At configuration location 708, device 702 may be scanned, for example using a NFC reader. Scanning device 702 may provide a UID, security information, or any other required data.

In some embodiments, the data may be transmitted to activation authority 710, and may include feature selections or other information from the configuring entity as well. The activation authority 710 may authenticate the device information and any feature selections, and may return an activation package to the configuration location 708. The activation package may include data or keys identifying a selected feature set, and may include digitally signed information or other security data to allow the device 702 to authenticate the package.

In some embodiments, activation authority 710 may provide activation packages or data, security certificates, or other information to configuration location 708 without the need to receive a specific request or device information first. For example, activation authority 710 may provide configuration location 708 with a database including device IDs for devices the configuration location is expected to receive, along with activation data corresponding to those devices. Configuration location 708 may then be able to scan devices 702 and automatically store the corresponding activation data to the device without the need to contact the activation authority 710. In another embodiment, a configuration client may be provided with a set number of activation packages which can be "used up" as they are loaded onto devices.

Once the configuration location 708 has an appropriate feature activation package for device 702, the package can be stored to the device, for example using a NFC transmitter to store data to a NFC tag on the device. In some embodiments, an NFC transmitter may be able to program multiple devices simultaneously (e.g. a pallet of devices), for example when all devices are to have the same features enabled. In some embodiments, an NFC transmitter may be able to target individual devices, for example by loading a feature set onto a specific device with a target UID in a pallet of devices. The device may never need to be turned on or unpacked to have the data loaded. When the device 702 is powered on, at 712, it may detect the stored activation package, verify the authenticity of the package, and activate a designated firmware or feature set identified in the package.

Figure 8:
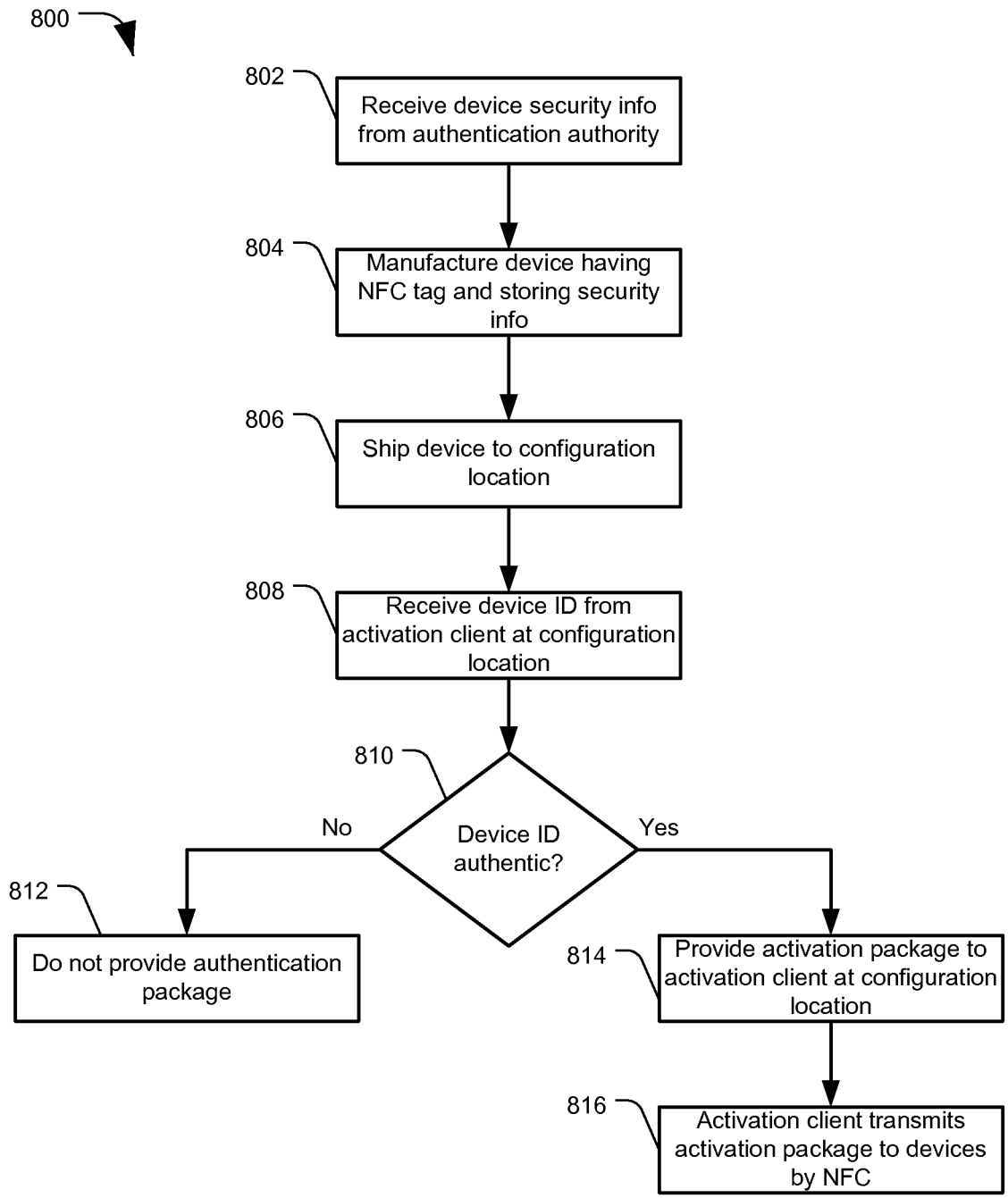
FIG. 8 is a flowchart of an illustrative embodiment of a method for late stage SKU assignment.

Turning to FIG. 8, an example embodiment of a method for late stage SKU assignment is shown and generally designated 800. Method 800 may correspond to an example process for feature activation using NFC, such as the process depicted in FIG. 7. Method 800 may include receiving device security information from an activation authority, at 802. For example, a manufacturer may receive one or more keys, digital certificates, or other security information from an activation authority to load onto a device configured for remote activation. In some embodiments, the activation authority and the manufacturer may be the same entity.

The method 800 may include manufacturing a device having an NFC tag, and storing security information to the device, at 804. The security information may be used to authenticate activation packages received from an activation authority. The security information may also be used to identify the device for authentication by an activation authority. The NFC tag may be loaded with information, such as a UID for the device, a model number, a manufacturer, or other information. Some or all of the information stored on the NFC tag may be encrypted or digitally signed, such as by using a secure key of the device.

Method 800 may include shipping the device to a configuration location at 806, such as configuration location 708 of FIG. 7. The configuration location may be the manufacturer's own warehouse, a distributor or retailer, or even an end recipient. At 808, the method may include receiving a device ID, for example at an activation authority or the manufacturer, from an activation client at the configuration location. For example, an activation client may be an automated or manual RFID reader, and may also include a hardware or software interface, and a network connection to contact the activation authority or manufacturer. For example, a user may enter desired options or features into a software user interface, which may transmit the selections to an activation authority. The activation client may scan one or more devices to obtain UIDs or other identifying information for the device, and may transmit the information to the activation authority or manufacturer, to identify and authenticate the device.

The method 800 may include determining if the device is authentic, for example using the device ID or other identifying information, at 810. If the device is not determined to be authentic, the activation authority may not provide an activation package, at 812. If the device is determined to be authentic at 810, the method may include providing an activation package to the activation client at the configuration location, at 814. The activation package may include security information for verifying the package, and may include a set of options or features to activate on the device.

The activation client may then transmit the activation package to one or more devices, at 816. For example, the NFC reader may store the activation package to the NFC tag of the device. In some embodiments, entire shipments or pallets of devices may be loaded with activation packages simultaneously, for example as part of a shipment process. When the device is powered on, it may detect the activation package and implement the designated features or options. In some embodiments, data for activation packages may be provided to the activation client without the need to transmit or authenticate device information at the activation authority, such as in steps 808 through 812.

Figure 9:
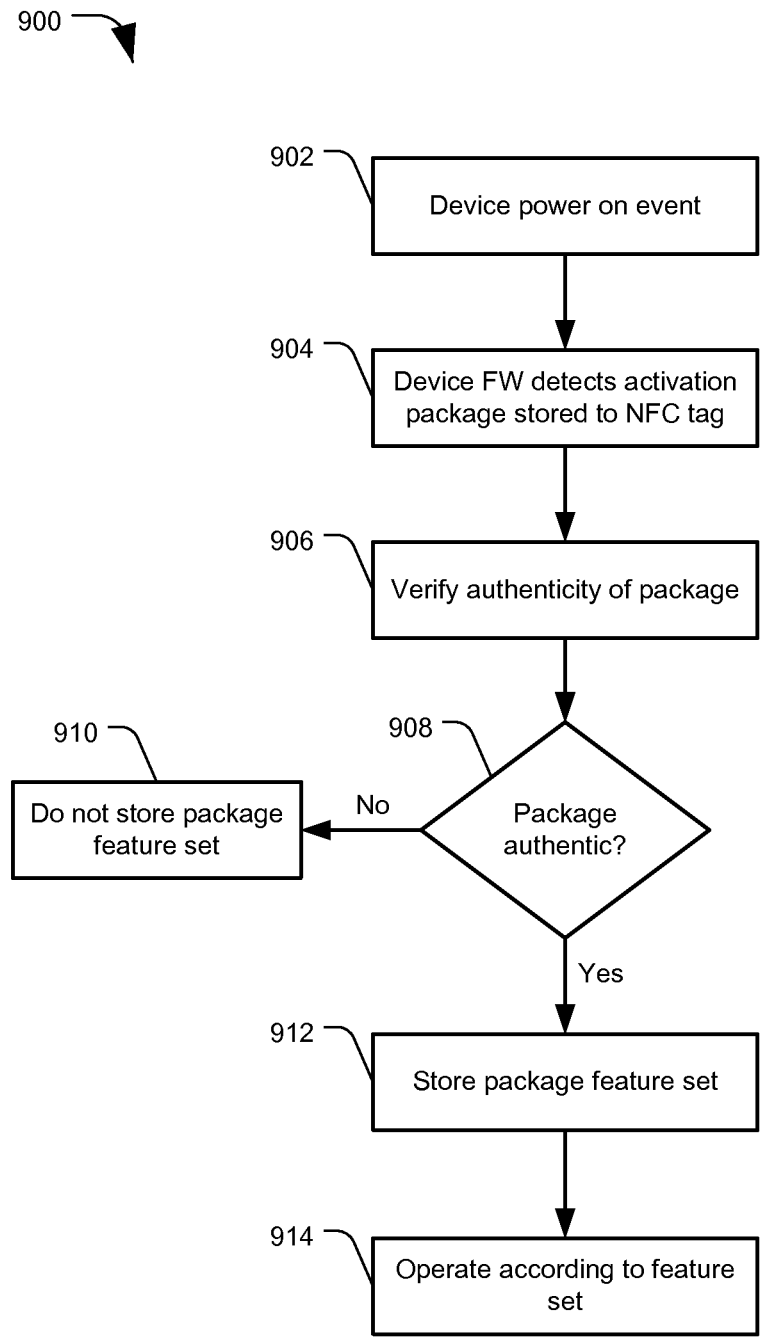
FIG. 9 is a flowchart of an illustrative embodiment of a method for late stage SKU assignment.

FIG. 9 depicts an example embodiment of a method for late stage SKU assignment, generally designated 900. The method 900 may include a device power on event, at 902. This may be a first time the device has been powered on, any subsequent power-on events, waking up from a sleep or hibernation mode, or another event.

The device may be configured with firmware to detect an activation package stored to a NFC tag of the device, at 904. For example, an activation package including a feature set for the device, security information, firmware or software, or other information may be stored to the NFC tag of the device, whether or not the device is powered on. The device may include firmware directing the device to check for any activation data stored to the NFC tag at a power on event.

The method may include verifying the authenticity of the activation package, at 906. For example, the device may use one or more keys stored to the device to decrypt or verify a signature on the activation package. If the package is not determined to be authentic, at 908, the method may include not storing or implementing the feature set identified in the package, at 910.

If the package is determined to be authentic, at 908, the method may include storing the package feature set to a memory of the device, or otherwise implementing the identified feature set, at 912. At 914, the method may include operating according to the feature set identified in the package.

Figure 10:
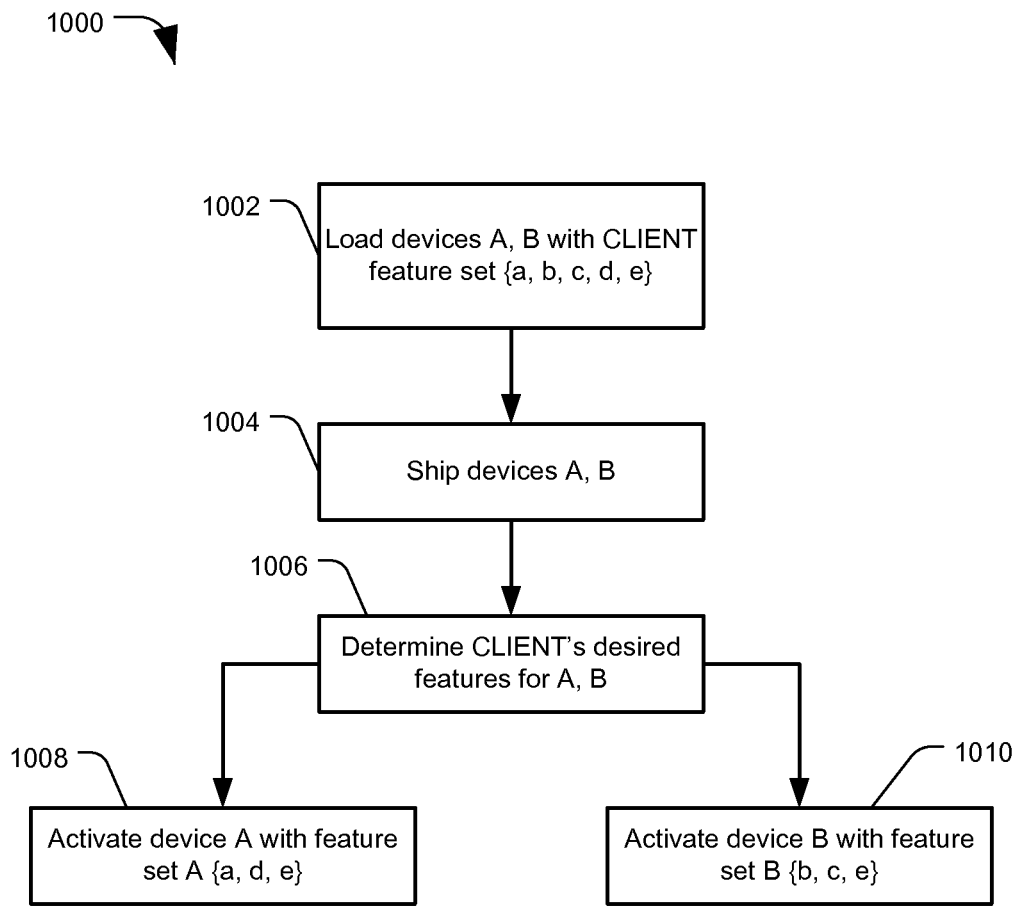
FIG. 10 is a flowchart of an illustrative embodiment of a method for late stage SKU assignment.

Turning to FIG. 10, an embodiment of a method for late stage SKU assignment is shown and generally designated 1000. In some embodiments, a device may be loaded with multiple potential features, options, or feature sets. Particular features to activate on the device may be selected after the device has shipped, for example at run time. Some example features for a data storage device may include a data block size, different recovery algorithms, and data encryption options.

For example, in some embodiments a device may be loaded with feature set 1, feature set 2, and feature set 3, with each feature set including unique features or a unique combination of features. Using remote feature activation methods and systems as described herein, feature set 2 may be selected and activated after the device has shipped, and feature sets 1 and 3 may not be used. In other embodiments, feature sets 1 and 2 may both be activated to run on the device, while feature set 3 may not be activated. In another embodiment, a device may be loaded with potential features 1, 2, 3, 4, and 5, for example by storing firmware capable of performing all potential features or a subset thereof. In some embodiments, features 1-5 may be the full set or superset of features the device firmware is configured to perform, and the selected subset of features that are enabled may include all potential features available on a device or less than all the features. Any combination of features 1 through 5 may be activated on the device, e.g. features 1, 2, and 5 may be selected and activated after shipping the device.

In some embodiments, an intended recipient may have an associated set of features. An intended recipient may be a customer, client, shipping recipient, geographical region, technical industry, target demographic, part of a supply chain, any other recipient, or any combination thereof. For example, the client may have ordered devices with these associated features in the past, or the client may have specifically requested to have these features made available. In some embodiments, the client may not want all the associated features on every device they order, and may choose to select certain features from the set to activate on their devices. If a manufacturer is producing devices for a known client, it may be desirable to load the client's associated feature set onto all the devices. Specific features from the feature set may be remotely activated on different subsets of the devices as the client's specific needs or requests become known.

Method 1000 may include loading devices A and B with CLIENT's associated feature superset, including features {a, b, c, d, e}, at 1002. For example, a manufacturer may know that CLIENT will request two devices (here, A and B), but not know which specific features CLIENT will want on each device. The manufacturer may then load both devices with all firmware, software, or components necessary to perform the entire feature set associated with the client.

The method 1000 may include shipping devices A and B, 1004. For example, this may include sending the devices directly to CLIENT, or simply shipping it from a manufacturing plant to another facility of the manufacturer, or to a shipping entity or other intermediary entity.

The method 1000 may include determining CLIENT's desired features for devices A and B. For example, CLIENT may place orders for specific feature sets after the devices have left the manufacturer, but before or after arriving at CLIENT. In the depicted embodiment of FIG. 10, CLIENT may choose to have a different set of features on device A and device B. The method 1000 may include activating device A with feature subset A, including features {a, d, e}, at 1008. Method 1000 may include activating device B with feature subset B, including features {b, c, and e}. The feature sets may be activated on the devices using the methods and systems described herein. Further, CLIENT may be able to activate additional features from the client's superset on devices A and B at a later time, since that functionality is already loaded on the device. For example, CLIENT may be able to pay for additional features through a commerce authority and receive an activation package to enable additional features.

Figure 11:
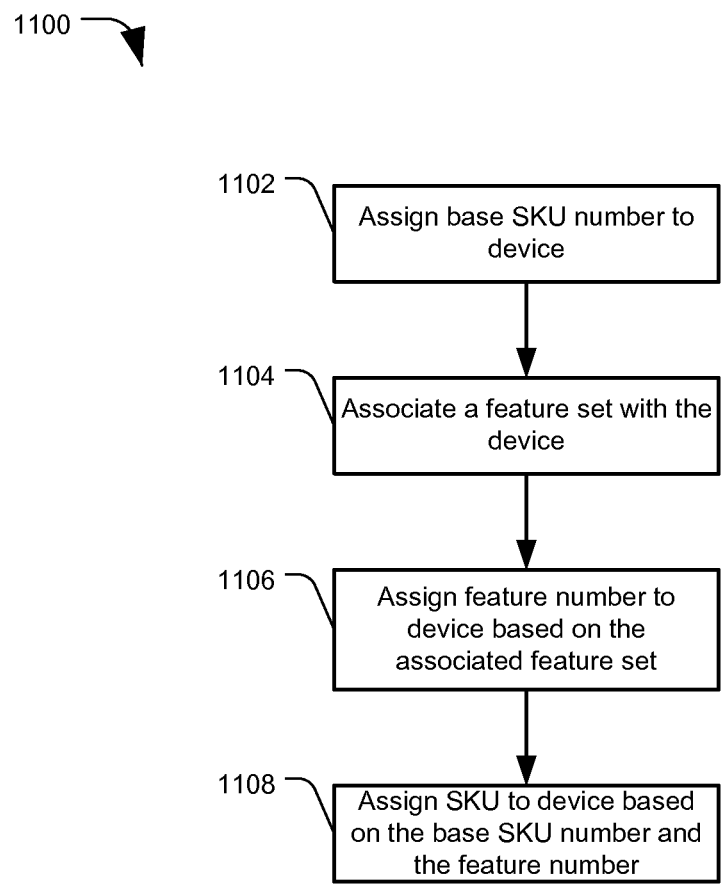
FIG. 11 is a flowchart of an illustrative embodiment of a method for late stage SKU assignment.

Turning to FIG. 11, an embodiment of a method of late stage SKU assignment is shown and generally designated 1100. Regarding inventory management, a stock keeping unit (SKU) may be used to identify or keep track of a distinct product, and the SKU may cover many or all attributes of the product. For example, a red plate from a manufacturer may have one SKU, while the same plate in blue may have a different SKU. However, individual instances of the same kind of blue plate may share the same SKU.

An SKU for a product may include numbers, letters, other characters, or a combination thereof, and may be comprised of a number of elements identifying aspects of a product. For example, an SKU might include a vendor, a collection, a design, a color, and a size. In another embodiment, a SKU may include a model number and a part number. In some embodiments, additional numbers or characters may be added to those based on features of the product. In yet another embodiment, an SKU may be a collection of numbers or characters alone and not directly correspond to any aspects of the product.

Accordingly, when a product may have many variations in features, options, warranty coverage, or other attributes, a manufacturer may need to create and track many SKUs for all the possible variations. This can lead to managing a large number of SKUs, with an associated increased complexity in supply lines. Reducing or simplifying SKUs through some or all of the supply line may increase efficiency. Further, when a product is shipped prior to determining a final feature set, a method for tracking products and managing SKUs may be required.

Method 1100 may include assigning a base SKU number to a device configured for late stage SKU assignment, at 1102. For example, this may include determining and assigning a portion of the SKU that is not dependent on the device's feature set. In an example embodiment, a manufacturer may use the model number alone. For example, a manufacturer may produce a model of devices which all have a single firmware set capable of performing a range of functions. Specific functions may be activated or deactivated later to produce devices with different options and values, which may accordingly require different SKUs, but for the purposes of production and initial shipping they may all share a base SKU number. In an embodiment, a base SKU number may include a model number with an appended base value or placeholder value in place of a final value corresponding to a feature set. For example, if the model number is 1234, a base SKU may be 1234-0000, with the 0000 comprising an appended base value which may change based on a later-activated feature set. In another embodiment, devices may be manufactured that are capable of being configured with four feature sets, and one of the feature sets may be activated as a "base" feature set. Accordingly, the base SKU for the devices may correspond to the base feature set. If the feature set on any of the devices is later modified, the SKU may be adjusted to match the updated feature set.

Method 1100 may include associating a feature set with the device, at 1104. For example, the feature set for a device may be determined after the device has shipped. In an embodiment, a customer may specify desired features after the device has been received or when it is still in transit. In another embodiment, activating a feature set may include switching from a base feature set to an alternate available feature set. Associating a feature set may include activating the feature set on the device using methods and systems as disclosed herein.

Method 1100 may include assigning a feature number to the device based on the associated feature set. For example, the assigned feature set may correspond to feature number 0185, corresponding to the specific configuration of features assigned to the device. In some embodiments, the feature number may include one or more "digits" or character positions corresponding to each feature which may be activated or deactivated. For example, if the device has four features which may be enabled or disabled, the feature number may be four digits long. The characters or digits corresponding to each feature may indicate a setting for the feature. For example, if one of the features or options is a storage capacity of the device, the corresponding feature number digit may represent a capacity of the device in gigabytes. In some embodiments, the feature number for each feature configuration may be randomly generated or assigned by a manufacturer. Other embodiments are also possible.

The feature number value may be included in an activation package loaded onto the device as part of a feature activation process. The device may store the feature number in addition to other identifying information for the device, such as a unique identifier, a model number, or other information. In some embodiments, the device may have feature numbers corresponding to the possible feature sets stored to memory, and be configured to determine and store an indication of the selected feature number or full SKU once a feature set is activated. For example, the device may store a pointer to the feature number corresponding to the selected feature set.

At 1108, the method may include assigning a complete SKU to the device based on the base SKU number (e.g. the model number) and the feature number. Returning to a previous example where the model number was 1234, and the base SKU was 1234-0000, the feature number may be used to replace the 0000 value. The complete or final SKU for the product, with features activated, may be 1234-0185. A device's SKU number, or the component elements of the complete SKU number, may be stored internally to the device, and may be accessed and referenced for warranty purposes, customer support, software or firmware upgrades, device validation and authentication, or other purposes. The manufacturer may maintain a listing of SKUs and the associated device model, feature set, and other device aspects. In some embodiments, a manufacturer may associate a UID with the SKU, for example in order to avoid providing warranty coverage and service to devices that have had their feature sets changed without authorization. Device IDs and corresponding SKUs could be stored to a database for retrieval when service or information on a particular device is desired.

Accordingly, while 10,000 units may be produced with a single model number, those units may later have different feature sets assigned and become hundreds or thousands of different final products. While the variety of possible feature sets may result in many SKUs, the complexity and variety can be postponed until late in the supply chain or after delivery, increasing efficiency.

As discussed, a wide variety of features, functions, and options may be enabled, activated, deactivated, or disabled on devices according to the present disclosure. For example, data storage device features may include recipient-specific unique capabilities and behavior, encryption, locking, device reverting, media recording, device pairing or networking, wear leveling, or options, or any combination thereof. Data storage devices may include any device configured to store data, such as internal or external hard drives, solid state memory drives, DVRs, electronic tablets, mobile phones, gaming systems, or other devices.

For example, a data storage device may have a variety of security features and functionality which can be activated, such as FIPS (Federal Information Processing Standards)-compliance, self-encrypting drive (SED) functionality, Instant Secure Erase (ISE) functionality, or Securing Diagnostics and Downloads (SDnD). Rather than developing, testing, and storing firmware for different combinations of security features, in some embodiments a single firmware may be developed and tested that is capable of performing all security features, with the option to activate, deactivate, or permanently disable various features. For example, instructions for various features may be deleted from the device to permanently disable the features.

In an embodiment, each of FIPS, SED, SDnD, and ISE may comprise a different security configuration of device features and attributes. Instead of setting a feature configuration at the firmware compile time, the firmware may include logical ports for each configuration of SED, ISE, SDnD, and FIPS, with diagnostics commands to change the configuration in run time. For example, device configuration may only be available through one or more locked ports. The logical ports may be selected or unlocked through trusted computing group (TCG) commands, which can check the authority and credentials of a command to determine whether the agent is allowed to perform the operation.

Figure 12:
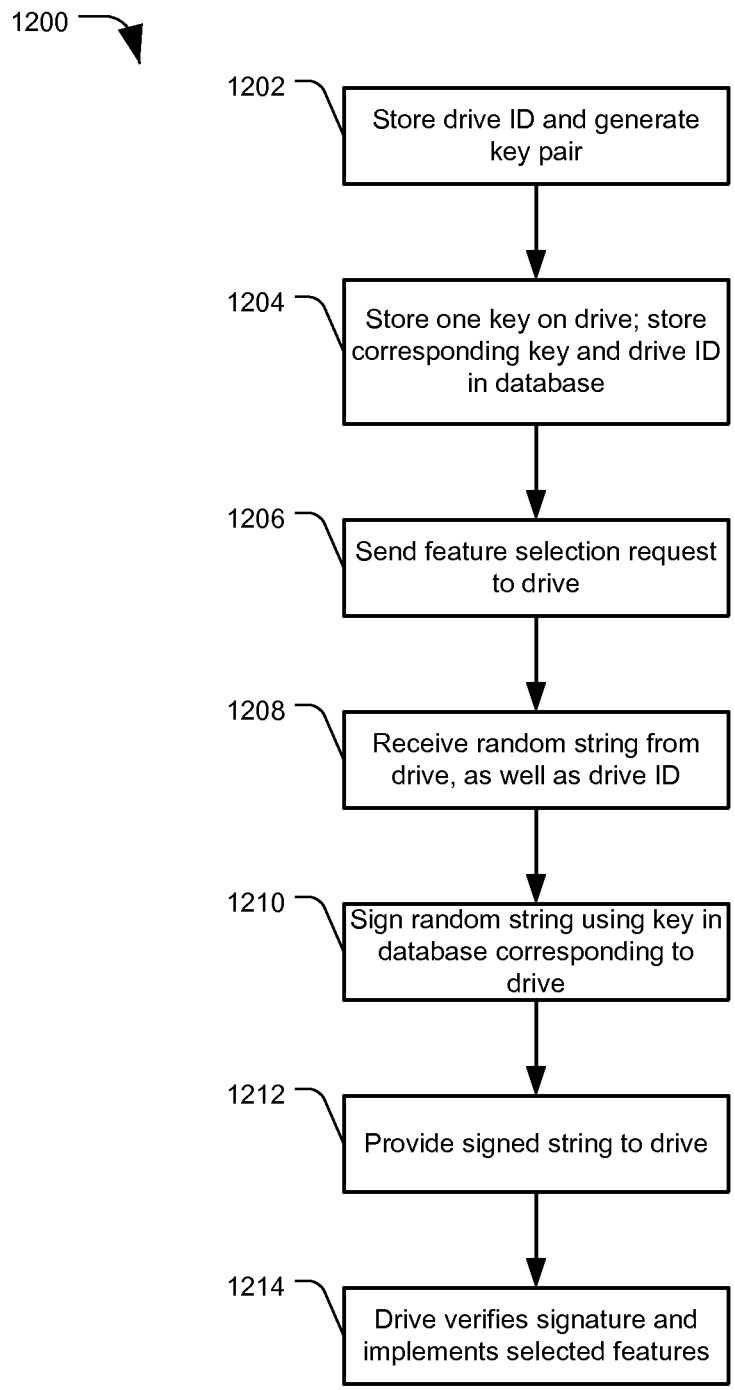
FIG. 12 is a flowchart of an illustrative embodiment of a method for late stage SKU assignment.

Turning to FIG. 12, an example embodiment of late stage SKU assignment is shown and generally designated 1200. When the drive is processed, e.g. during the manufacturing process, the drive's serial number may be recorded and a key pair may be generated, such as a public-private key pair, at 1202. At 1204, the private key may be maintained by a manufacturer, or shared with one or more trusted authorities, such as licensing, commerce, or activation authorities. For example, drive IDs and corresponding keys, as well as other verification information, may be stored to one or more databases. The public key may be assigned to and loaded on the drive.

In order for the drive to process changes to the logical ports, a requesting entity may need to provide proof of authority. In an example embodiment, when a drive receives a feature selection request, at 1206, the drive may generate a random output string, at 1208. The string and device serial number may be sent to an activation authority. In some embodiments, an activation client may also need to provide an ID, password, or other verifying information. Once the activation authority has optionally verified the device or activation client, the activation authority may "sign" the random string by encrypting it using the private key corresponding to the device, at 1210. The encrypted string may then be transmitted to the device or activation client, at 1212. The drive may verify the authority of the requestor by decrypting the encrypted string using the public key stored on the device. If the decrypted string matches the string generated by the device, the device may enable the requested configuration, at 1214.

In another embodiment, a data storage device may have different implementations for data block sizes. A feature which may be selected or adjusted on a data storage device may include a block size emulation parameter. Block size emulation may include performing data communications with a first data block size and performing data access operations to a data storage medium of the device with a second data block size For example, data storage drives may be configured to have a set physical sector size, such as 512N (i.e. 512-byte block size) or 4KN (i.e. 4 KB block size), wherein the "N" may refer to the natural, or actual size of the data blocks used by the data storage medium. However, a drive may also be configured to emulate a different block size than the actual size used by the device, for example to be compatible with various operating systems or programs. For example, a drive may be configured as 512E, representing a 512-byte block size emulation for interfacing with software or devices, while having a different natural block size used by the device itself. Other natural and emulated block sizes are also possible. Reconfiguring the block size emulation of a device by loading or changing firmware at the factory can be inefficient for the supply chain.

Figure 13:
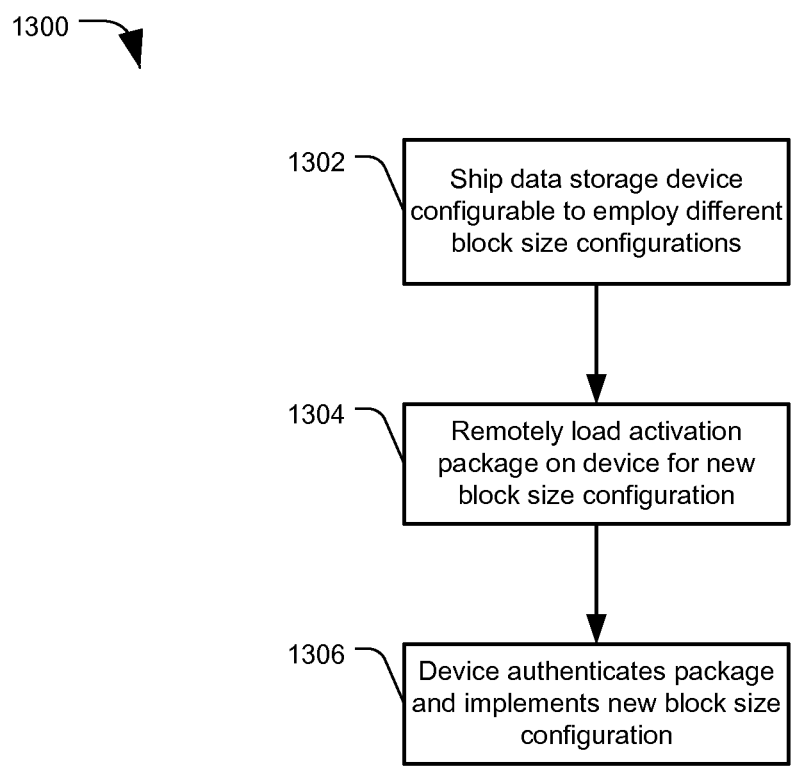
FIG. 13 is a flowchart of an illustrative embodiment of a method for late stage SKU assignment.

However, employing remote feature activation allows for rapidly and securely changing the block emulation size by establishing a connection and activating a desired configuration. FIG. 13 depicts an example embodiment of a method for late stage SKU assignment generally designated 1300. At 1302, the method may include shipping a data storage device configurable to employ different block size configurations. For example, the data storage device may include one or more firmware sets allowing the device to employ different natural or emulated block sizes. The device may have an initial block size configuration which can be changed later, or the device may need to be activated with a particular block size configuration before it can be used for storing data.

At 1304 the method may include remotely loading an activation package onto the device for a new block size configuration. The data package may be loaded onto the device as described in the examples and embodiments herein. For example, this may include steps of receiving a device ID or other identifying information, verifying the device, and delivering an activation package to the device, which may include security information and identify a feature set to activate on the device.

At 1306, the device may authenticate the activation package and implement a new block size configuration based on the package. For example, the device may authenticate security information received with the activation package using keys or certificates stored on the device. This may prevent unauthorized changes to the device's block size configuration, which could cause format corruption or other problems on the device. The device may select a firmware set or configure device operations based on the block size configuration identified in the activation package. The activation package may also include settings for other features of the device. In some embodiments, the block size configuration may be changed by another activation package at a later time.

In accordance with various embodiments, the methods described herein may be implemented as one or more software programs running on a computer processor or controller device. In accordance with another embodiment, the methods described herein may be implemented as one or more software programs running on a computing device, such as a personal computer that is using a data storage device such as a disc drive. Dedicated hardware implementations including, but not limited to, application specific integrated circuits, programmable logic arrays, and other hardware devices can likewise be constructed to implement the methods described herein. Further, the methods described herein may be implemented as a computer readable storage medium or device, such as hardware components storing instructions that when executed cause a processor to perform the methods. Instructions for performing the methods disclosed herein may also be broadcast to a device for execution using computer readable transmission media.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. A method comprising:
   assigning a stock keeping unit (SKU) number to an electronic device, including:
     assigning a preset portion less than all of the SKU number;
     storing the preset portion in a memory of the electronic device during a manufacturing process;
     after the electronic device is packaged for shipping to a destination, receiving a transmission including an indication of a variable portion less than all of the SKU;
     assigning the variable portion to the electronic device, the variable portion based on the indication, including determining the variable portion based on the set of functions enabled on the device from a plurality of functions that firmware of the device is capable of performing; and
     storing the indication to the memory.

2. The method of claim 1 further comprising enabling the set of functions for the device after packaging the device for shipping, enabling the set of functions including limiting functionality the device is enabled to perform from the plurality of functions.

3. The method of claim 1 further comprising:
   storing security data to the device;
   providing an activation package to the device including:
     a feature number corresponding to the set of functions;
     authentication information to authenticate the activation package to the device via the security data; and
     directing the device to store the feature number to the device.

4. The method of claim 1 further comprising changing the variable portion of the SKU number after use of the device has begun.

5. The method of claim 1 further comprising assigning the variable portion of the SKU number after activation of the device.

6. The method of claim 1 further comprising:
   the preset portion includes a placeholder value for the variable portion; and
   assigning the variable portion includes replacing the placeholder value with the variable portion.

7. A device comprising:
   a data storage medium storing:
     a predefined portion of a complete stock keeping unit (SKU) of the device the predefined portion assigned prior to shipping the device from a manufacturer;
   a processor configured to:
     receive, from an activation entity external to the device, an indication of a variable portion of the complete SKU, the complete SKU based on the predefined portion and the variable portion;
     implement a selected firmware configuration based on the indication, the selected firmware configuration including a set of functions enabled on the device from a plurality of functions that firmware of the device is capable of performing;
     determine the variable portion based on the selected firmware configuration; and
     store the indication to a memory.

8. The device of claim 7 further comprising:
   a chip configured to receive the indication from the activation entity when the device is in a power-off state; and
   the processor configured to retrieve the indication from the chip.

9. The device of claim 7 comprising the processor further configured to:
   receive an updated indication during operation; and
   store the updated indication, the variable portion of the SKU updating based on the updated indication.

10. The device of claim 7 further comprising:
    the predefined portion includes a placeholder value for the variable portion; and
    the processor further configured to determine the complete SKU by replacing the placeholder value with the variable portion based on the indication.

11. The device of claim 7 further comprising:
    the data storage medium storing security data;
    the indication is received from the activation entity in an activation package including authentication data; and
    the processor further configured to authenticate the authentication data using the security data prior to storing the indication.

12. The device of claim 11 further comprising:
    the data storage medium storing a unique ID for the device; and
    the processor further configured to provide the unique ID to the activation entity prior to receiving the activation package.

13. The device of claim 7 further comprising:
the predefined portion is stored to the data storage medium during a manufacturing process of the device; and
the processor is further configured to receive the indication from the activation entity via communication over a network after the device is shipped from a manufacturing location.

14. A device comprising:
a memory;
a processing circuit configured to:
 access firmware stored in the memory, the firmware capable of a plurality of functions;
 maintain a predefined portion of a complete stock keeping unit (SKU) of the device, the complete SKU including a predefined portion and a variable portion, the predefined portion assigned prior to shipping the device from a manufacturer of the device, the variable portion assigned based on features of the firmware selected after manufacturing;
 receive an indication of the variable portion;
 determine the variable portion based on a set of functions enabled on the device from the plurality of functions; and
 store the indication of the variable portion in the memory.

15. The device of claim 14 further comprising:
the processing circuit is configured to set a selected configuration of functions the device is limited to performing from the plurality of functions that the device is capable of performing; and
determine the variable portion based on the selected configuration of functions.

16. The device of claim 14 further comprising:
a near field communication (NFC) chip configured to receive the indication of the variable portion without the device being in a powered-on state; and
the processing circuit further configured to retrieve the indication of the variable portion from the NFC chip when the device is powered on.

17. The device of claim 16 comprising the processor further configured to:
based on the indication of the variable portion retrieved from the NFC chip:
 enable a selection of features from a full set of available features of the device; and
 disable use of any features not enabled.

18. The device of claim 17 comprising the processor further configured to:
receive an activation package including the indication of the variable portion and security data to authenticate the activation package;
verify the authenticity of the activation package based on the security data and a security key stored to the memory; and
enable the selection of features after verifying the authenticity of the activation package.

* * * * *

UNITED STATES PATENT AND TRADEMARK OFFICE
CERTIFICATE OF CORRECTION

PATENT NO. : 9,633,330 B1  
APPLICATION NO. : 14/245127  
DATED : April 25, 2017  
INVENTOR(S) : Wajahat Ali Page 1 of 1

It is certified that error appears in the above-identified patent and that said Letters Patent is hereby corrected as shown below:

On the Title Page

(73) Assignee should read Seagate Technology LLC

Signed and Sealed this  
Thirtieth Day of May, 2017

Michelle K. Lee  
*Director of the United States Patent and Trademark Office*